United States Patent Office 3,537,307
Patented Nov. 3, 1970

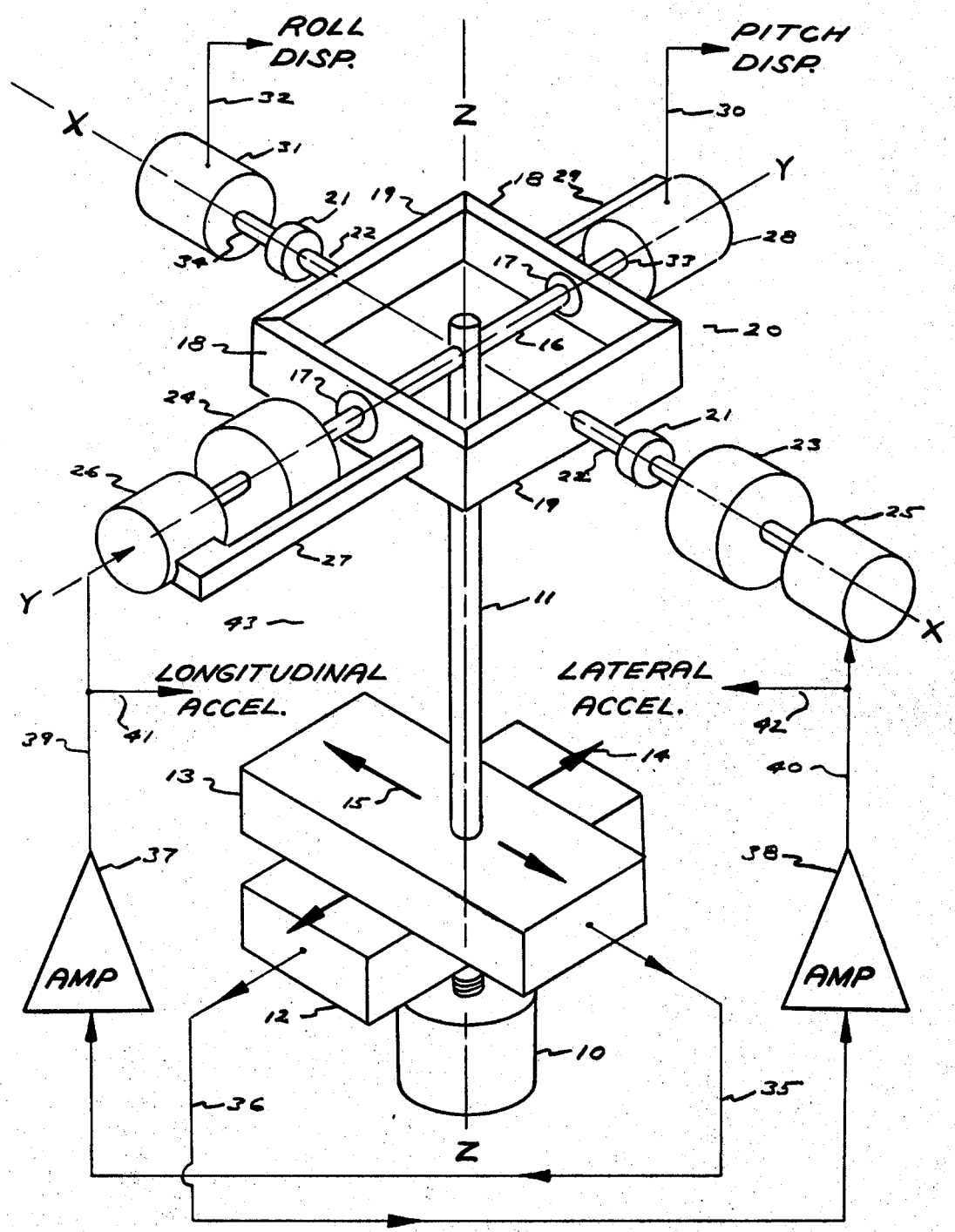

3,537,307
SELF-COMPENSATED PENDULOUS INERTIAL REFERENCE APPARATUS FOR VEHICLES
Donald J. Pliha, 225 S. Hamel Drive,
Beverly Hills, Calif. 90211
Filed Oct. 10, 1968, Ser. No. 775,988
Int. Cl. G01c 23/00
U.S. Cl. 73—178                               2 Claims

ABSTRACT OF THE DISCLOSURE

A non-gyroscopic inertial data reference apparatus for vehicles developing pitch angle, roll angle, lateral and longitudinal acceleration information and comprising a gravity-responsive pendulum device compensated for the effects of horizontal acceleration by the use of two mutually perpendicular accelerometers, both of which are mounted on and free to move with the universally mounted pendulum.

---

This invention relates to self-compensated pendulous type inertial references for vehicles, and more particularly to a unique, gravity-responsive, acceleration-corrected pendulum apparatus which is intended for use in supplying vehicle attitude displacement and horizontal acceleration information to the various devices and systems aboard the vehicle requiring such informtion.

In air and sea navigation, it is often desired to develop, without external reference, vehicle pitch angle, roll angle, fore and aft (longitudinal) acceleration, and sideward (lateral) acceleration. The longitudinal and lateral acceleration information may then be fed into a suitable navigation computer, not a part of this invention, to yield ground speed, track, and drift angle information. The sensing of vehicle attitude and horizontal acceleration is accomplished in accordance with this invention by an inertial data reference apparatus which obviates the need for the usual gyro-stabilized platform and which utilizes commercially available components of low cost and light weight. The invention comprises a pair of accelerometers, one of which has its sensitive axis in the plane of the vehicle longitudinal axis or roll axis and the other having its sensitive axis in a plane perpendicular to the vehicle longitudinal axis or parallel to the pitch axis with both accelerometers mutually stabilized in the local horizontal plane by a gravity-responsive pendulum.

At the present time many different types of attitude and navigational data reference systems for vehicles, such as ships and aircraft, are available, a large majority of which operate on the gyroscopic principle. The opertion of these various systems depends upon the fact that a spinning gyroscope has an inertia that tends to maintain the gyro at its original orientation. As the vehicle accelerates, changes attitude, or turns, the deviations relative to the gyroscope's original position are sensed and are converted into a form that provides the desired attitude and/or navigational information. Generally, a plurality of gyroscopes cause the platform on which inertial accelerometers are mounted to be stabilized and maintained at its original (e.g., horizontal) orientation. Thus, the true horizontal accelerations of the vehicle can be detected— provided the stabilized platform remains horizontally level. Unfortunately, certain inherent inaccuracies in the manufacture and operation of the gyroscopes and the stabilized platform cause various cumulative errors which must be corrected in order to maintain a reasonable accuracy in the operation of the accelerometers. The equipment for suitably correcting these errors becomes very complex, heavy, space consuming, and expensive.

As previously mentioned, the present invention eliminates the gyroscopic elements normally associated with the leveling of the stabilized platform and instead proposes the use of a gravity-responsive pendulum apparatus to maintain the accelerometers in the horizontal plane. A pendulum will maintain the true vertical with great accuracy when the vehicle is at rest or moving uniformly in a straight line, but is subject to temporary error during changes of speed or heading. Such errors arise from the fact that the pendulum is subject not only to the acceleration of gravity but to any other acceleration force acting thereon, such as horizontal acceleration forces due to turns and changes of speed of the vehicle.

In the present invention, an acceleration correction is introduced such that the true vertical reference will be maintained by the pendulum even during turns and marked changes of speed. More specifically, in the operation of the present invention, the inertia of the pendulum, upon changes in the horizontal acceleration of the vehicle, is offset and the center of inertia of the pendulum is made to reproduce or follow the acceleration of the vehicle, by applying to the pendulum forces which are proportional to the horizontal accelerations of the vehicle.

It is now apparent that the acceleration corrected pendulum of the present invention may serve as a highly accurate vertical reference to be used in the determination of vehicle pitch and roll attitude. Also, since the two mutually perpendicular accelerometers therein are mounted on and free to move with the pendulum about its universal mounting, they will have their sensitive axes continually maintained in the horizontal plane thus providing accurate information regarding vehicle accelerations in the horizontal plane. These acceleration signal quantities are used to continuously correct the pendulum for acceleration-induced error in addition to providing information to a separate navigation computer.

It is a principal object of the present invention to provide an improved, low cost, non-gyroscopic inertial data reference apparatus for vehicles having a minimum number of parts and having high accuracy and reliability.

Another object of the invention is to develop information pertaining to the pitch and roll attitude of a vehicle by means of a relatively simple pendulum apparatus corrected for acceleration effects.

Still another object of the invention is to develop information pertaining to the horizontal acceleration of the vehicle along two mutually perpendicular axes by the use of accelerometers stabilized in the horizontal plane by the vertical-seeking property of a pendulum, and to use such information for both the acceleration correction of the pendulum and as a navigational data input to a separate navigation computer.

Other and further objects of the present invention will be apparent from the following description and claims and and are illustrated in the accompanying drawing which, by way of illustration, shows a preferred embodiment of the present invention and the principles thereof and what is now considered to be the best mode contemplated for applying these principles. Other embodiments of the invention embodying the same or equivalent principles may be made as desired by those skilled in the art without departing from the present invention.

The sole drawing illustrates the invention and includes a perspective view of the pendulum apparatus and a schematic view of the control system thereof.

Referring now to the drawing and particularly to the construction of the pendulum apparatus indicated generally at 43, it is shown that the pendulous weight 10 is rigidly fixed to the pendulum shaft 11. Preferably, the weight 10 is threaded or otherwise adjustably mounted upon the shaft 11 so that the weight can be adjusted upwardly or downwardly of the shaft 11 along the axis Z—Z for dynamic balancing of the pendulum apparatus 43. The shaft 11 is rigidly attached to the pitch trunnion 16, which extends across the gimbal frame 20, being supported and journalled in suitable anti-friction bearings 17, pressed into the side frame members 18. Note that the axis of rotation of the pitch trunnion 16 is parallel to the transverse axis Y—Y of the vehicle and is normal to the longitudinal axis X—X of the vehicle.

The two end members 19 of the frame 20 incorporate trunnions 22 extending outwardly along a plane corresponding to the axis X—X of the vehicle to allow rotational freedom of the frame 20 and its associated elements about the roll axis X—X of the vehicle. The trunnions 22 are supported and journalled in suitable anti-friction bearings 21, carried by a structural member of the vehicle, not shown. Note that the axis of rotation of the trunnions 22 is parallel to the longitudinal axis X—X of the vehicle and is normal to the transverse axis Y—Y of the vehicle.

In operation, when the vehicle remains in a level pitch attitude, the pendulum apparatus 43 points directly downwardly at the floor of the vehicle. If the vehicle "noses down," the pendulum apparatus 43 is displaced, rotating the pitch trunnion 16 relative to the frame 20 and affording a direct indication that the pitch attitude of the vehicle has changed. On the other hand, if the nose of the vehicle is brought up, the pendulum apparatus 43 rotates the trunnion 16 in the opposite direction.

Similarly, when the vehicle remains in a level roll attitude, the pendulum apparatus 43 again points straight downwardly. If the vehicle should roll to the left, for example, the pendulum apparatus 43 is once again displaced, rotating the frame 20 and trunnions 22 relative to the structure of the vehicle about the axis X—X, thus affording a direct indication that the roll attitude of the vehicle has changed. If the vehicle is caused to roll to the right, the pendulum apparatus 43 will rotate the frame 20 and trunnions 22 about the axis X—X in the opposite direction.

The simple pendulum just described would be subject to error as a result of horizontal accelerations of the vehicle acting on the pendulum apparatus 43 and particularly on the weight 10, but this error is corrected by means of the acceleration correction control system, which is activated by the output signals developed by the pendulously-mounted accelerometers 12 and 13, to be described next.

For the purpose of compensating or correcting the pendulum apparatus 43 for the acceleration forces created by changes in vehicle speed along the axis X—X, the accelerations are measured along the sensitive axis 15 of the longitudinal accelerometer 13 in a plane parallel to the axis X—X. The accelerometer 13 is rigidly mounted on and free to move with the universally-mounted pendulum apparatus 43. The accelerometer 13 is provided with a pick-off for developing a signal voltage having an amplitude and phase corresponding to the instantaneous value and direction of acceleration along the sensitive axis 15. The signal voltage developed by the accelerometer 13 is fed through conductor 35 to the input of a servoamplifier 37, which is of substantially conventional design. The amplified output signal voltage from the servoamplifier 37 is representative in proportion and sense of the signal from the pick-off of the accelerometer 13 and is fed through conductor 39 to energize the electromagnetic trunnion torquer 26. The torquer 26 is used to rotate the pendulum apparatus 43 about the axis Y—Y by means of the trunnion 16 to counterbalance the drag due to the inertia of the pendulous weight 10 whenever an acceleration occurs along the axis X—X. Thus the center of inertia of the weight 10, instead of lagging relative to the vehicle as it accelerates, is accelerated at the same rate and as a result, the pendulum apparatus 43 is maintained in accordance with the true vertical about the axis Y—Y at all times.

Similarly, for the purpose of compensating or correcting the pendulum apparatus 43 for the acceleration forces created by changes in vehicle speed along the axis Y—Y, the accelerations are measured along the sensitive axis 14 of the lateral accelerometer 12 in a plane perpendicular to the axis X—X and parallel to the axis Y—Y. The accelerometer 12 is rigidly mounted on and free to move with the universally-mounted pendulum apparatus 43. The accelerometer 12, servoamplifier 38, and trunnion torquer 25 are identical in design and operation to the elements 13, 37, and 26 comprising the longitudinal acceleration correction system, previously described. In this case, however, the output voltage of the servoamplifier 38 is used to energize the trunnion torquer 25 through conductor 40 to rotate the trunnions 22 and the frame 20, with its associated elements, about the axis X—X to counterbalance the drag due to the inertia of the pendulous weight 10.

With the arrangement just described, it is apparent that translatory accelerations acting on the pendulum apparatus 43 from any angle about the vertical axis Z—Z in the horizontal plane will be resolved into signal quantities representing rectangular acceleration components by means of the two mutually perpendicular sensitive axes 14 and 15 of the accelerometers 12 and 13, respectively. With proper calibration, accordingly, the pendulum apparatus 43 may be effectively corrected for changes in horizontal acceleration of the vehicle.

It should be understood that if the accelerometers 12 and 13 were rigidly mounted, or "strapped-down," to the structure of the vehicle and not pendulously mounted, the sensitive axes of the accelerometers would register not only horizontal accelerations but also accelerations due to changes in the attitude of the vehicle. This would not give the true horizontal acceleration of the vehicle, which is the factor causing horizontal acceleration forces on the pendulum apparatus 43 at right angles to the acceleration of gravity. Furthermore, the acceleration signals developed by such "strapped-down" accelerometers would be unsuitable for use with an inertial navigation computer.

The electromagnetic trunnion torquers 25 and 26 are preferably of the well-known rotary solenoid variety. Both torquers 25 and 26 are identical and comprise coil windings that encompass magnetic armatures which are mechanically coupled to either the pitch trunnion 16 or the roll trunnion 22, whichever the case may be. The housing of the pitch runnion torquer 26 is fixed too and rotates with the frame 20, by means of the support 27, about the axis X—X. The roll trunnion torquer 25 has its housing fixed to the structure of the vehicle, not shown, when de-energized, the torquers 25 and 26 offer no opposition to the rotation of their respective trunnions 22 and 16.

Dynamic lateral displacement of the vehicle is a relatively long period persistent quantity whereas movement of the pendulum apparatus 43 due to yawing of the vehicle is of a relatively high frequency and usually not persistent. Due to their high frequency nature, the accelerations developed by yawing moments of the vehicle are not detected by the lateral accelerometer 12 since they are of relatively small amplitude and inconsequential insofar as the acceleration correction of the pendulum apparatus 43 is concerned. However, in order to avoid short duration spurious angular displacements of the trunnions 16 and 22, caused by turbulent vehicle operating conditions or vehicle yawing, damping devices 24 and 23 are provided for the trunnions 16 and 22 and may take the form of open ended cylindrical copper cups rotatable about the X—X and Y—Y axes in accordance with the rotation of the trunnions 22 and 16, with each having an eddy-current brake in the form of a permanent magnet, not shown. Rotation of the copper cups in the magnetic field of the magnets generates eddy currents which provide a braking effect proportional to the velocity of the disturbance.

The signal voltages which represent angular displacement of the vehicle about its pitch and roll axes are developed on conductors 30 and 32 by the pick-off devices 28 and 31, respectively. The pick-off devices 28 and 31 may take the form of rotary transformers and are installed such that their rotor shafts 33 and 34 are mechanically coupled and responsive to the rotations of the trunnions 16 and 22, respectively. The housing of the pitch pick-off device 28 is rigidly fixed by the support 29 to the frame 20 with the housing of the roll pick-off device 31 being rigidly fixed to a structural member of the vehicle, not shown. It will be appreciated that the amplitude and phase of each of these signal voltages from the devices 28 and 31 represents the extent and direction of angular displacement of the vehicle about the pitch and roll axes, respectively. These signals may be applied to any desired apparatus on the vehicle requiring such attitude information.

To provide signal voltages to a navigation computer, not a part of this invention, which are representative of the amplitude and direction of vehicle acceleration along the axes X—X and Y—Y, the servoamplifiers 37 and 38 supply appropriate signal voltages for this purpose on the conductors 41 and 42, respectively.

Due to mechanical limitations inherent in the design of the pendulum apparatus 43, the device can only respond to pitch and roll displacements of a limited amplitude; typically, the invention may be made operative over a total change in pitch or roll of plus or minus 70 to 90 degrees. This is not a serious disadvantage however, since sharp diving, climbing, and rolling movements are not encountered in the operation of most vehicles, such as sea-going ships, and indeed, in the case of aircraft, should be avoided, especially under marginal weather conditions during instrument flight.

From the foregoing it will be seen that there is provided by the invention herein disclosed and described a freely mounted pendulum which is maintained at all times with its vertical axis in accordance with the true vertical. The pendulum is prevented from assuming the pseudo-vertical upon changes in the movement of the vehicle by mechanism which continuously generates forces acting on the pendulum which forces are applied to and prevent any lag of the pendulum and cause it to accurately partake of the changes in the motion of the vehicle. Furthermore, since the pendulum continuously remains at the true vertical due to compensation for acceleration, no correction is necessary for the rotation of the earth or movement of the vehicle over the earth other than that effected by the natural pull of gravity.

Various changes may be made in the embodiment of the invention hereon specifically described without departing from or sacrificing any of the advantages of the invention or any features thereof, and nothing herein shall be construed as limitations upon the invention, its concept or structural embodiment as to the whole or any part thereof except as defined in the appended claims.

What is claimed is:

1. In an inertial reference apparatus for vehicles, the combination comprising:
   first measuring means responsive to the acceleration of the vehicle along a first axis for producing a signal indicative of said acceleration,
   second measuring means responsive to the acceleration of the vehicle along a second axis perpendicular to the first axis for producing a signal indicative of said acceleration,
   a pendulum support,
   a pendulum mounted in the support for movement about mutually perpendicular first and second pivot axes corresponding to the response axes of the first and second measuring means,
   means for mounting said first and second measuring means on said pendulum such that the acceleration-responsive axes of both measuring means are maintained in the horizontal plane by the vertical-seeking property of the gravity-responsive pendulum,
   means for applying a variable torque about the first-named pivot axis of said penedulum to compensate for the effect of horizontal accelerations on said pendulum,
   means for applying a variable torque about the second-named pivot axis of said pendulum to compensate for the effect of horizontal accelerations on said pendulum,
   means for activating said first-named torque means in accordance with vehicle acceleration sensed by the first measuring means, and
   means for activating said second-named torque means in accordance with vehicle acceleration sensed by the second measuring means.

2. In an inertial reference apparatus for vehicles, the combination comprising:
   first measuring means responsive to the acceleration of the vehicle along the fore and aft axis thereof for producing a signal indicative of said acceleration,
   second measuring means responsive to the acceleration of the vehicle along the transverse axis thereof for producing a signal indicative of said acceleration,
   a pendulum support,
   a pendulum mounted in the support for movement about mutually perpendicular first and second pivot axes corresponding to the fore and aft and transverse axes of the vehicle,
   means for mounting said first and second measuring means on said pendulum such that the acceleration-responsive axes of both measuring means are maintained in the horizontal plane by the vertical-seeking property of the gravity-responsive pendulum,
   means for applying a variable torque about the first-named pivot axis of said pendulum to compensate for the effect of horizontal accelerations on said pendulum,
   means for applying a variable torque about the second-named pivot axis of said pendulum to compensate for the effect of horizontal accelerations on said pendulum,
   means for activating said first-named torque means in accordance with vehicle acceleration along the transverse axis thereof as sensed by the first measuring means,
   means for activating said second-named torque means in accordance with vehicle acceleration along the fore and aft axis thereof as sensed by the second measuring means,
   means for providing a signal proportional to the angular displacement between the vertical axis of said pendulum and the vehicle fore and aft axis about the transverse or pitch axis of said vehicle, and
   means for providing a signal proportional to the angular displacement between the vertical axis of said pendulum and the vehicle transverse axis about the fore and aft or roll axis of said vehicle.

References Cited

UNITED STATES PATENTS 2,497,607   2/1950   Herr _____ 33—220

DONALD O. WOODIEL, Primary Examiner

U.S. Cl. X.R.

33—220; 244—80